United States Patent

Young

Patent Number: 5,993,158
Date of Patent: Nov. 30, 1999

[54] METHOD AND APPARATUS FOR AERATION USING FLEXIBLE BLADE IMPELLER

[75] Inventor: Richard Nils Young, Atlanta, Ga.

[73] Assignee: DBS Manufacturing, Inc., Forest Park, Ga.

[21] Appl. No.: 08/953,256

[22] Filed: Oct. 17, 1997

[51] Int. Cl.⁶ ............................................. B63H 1/28
[52] U.S. Cl. .................. 416/132 R; 416/132 A; 416/223 R; 416/234; 416/240; 416/44
[58] Field of Search ............... 416/240, 223 R, 416/234, 132 R, 132 A, 138, 44, 52, 53; 366/326.1, 342, 343

[56] References Cited

U.S. PATENT DOCUMENTS

| | | | |
|---|---|---|---|
| 891,093 | 6/1908 | Parson et al. | 416/132 A |
| 1,854,644 | 4/1932 | Calby | 416/132 A |
| 1,961,228 | 6/1934 | Knox | 416/240 R |
| 2,442,783 | 6/1948 | Senn | 253/39 |
| 3,915,591 | 10/1975 | Aiki et al. | 416/132 |
| 4,037,987 | 7/1977 | Charles et al. | 416/132 |
| 4,105,366 | 8/1978 | Spellman | 416/132 |
| 4,334,824 | 6/1982 | Tsuchikawa et al. | 416/132 |
| 4,347,038 | 8/1982 | Hayashi et al. | 416/132 |
| 4,547,126 | 10/1985 | Jackson | 416/132 |
| 4,627,791 | 12/1986 | Marshall | 416/132 |
| 4,900,227 | 2/1990 | Trouplin | 416/132 |
| 5,584,656 | 12/1996 | Rose | 416/132 |
| 5,642,986 | 7/1997 | Rose | 416/240 |
| 5,655,884 | 8/1997 | Rose | 416/240 |

FOREIGN PATENT DOCUMENTS

| | | | |
|---|---|---|---|
| 939847 | 11/1948 | France | 416/240 R |
| 588997 | 10/1927 | Germany | 416/240 R |
| 8645 | 4/1910 | United Kingdom | 416/240 R |

*Primary Examiner*—Edward K. Look
*Assistant Examiner*—Ninh Nguyen
*Attorney, Agent, or Firm*—Needle & Rosenberg, P.C.

[57] ABSTRACT

An impeller having flexible impeller blades with a stiffness which allows the blades to flex into a backward-curved impeller configuration at the maximum intended rotational speed of operation, and to return to a more radial blade configuration at lower rotational speeds, thereby enabling efficient operation at a broad range of rotational speeds.

17 Claims, 4 Drawing Sheets

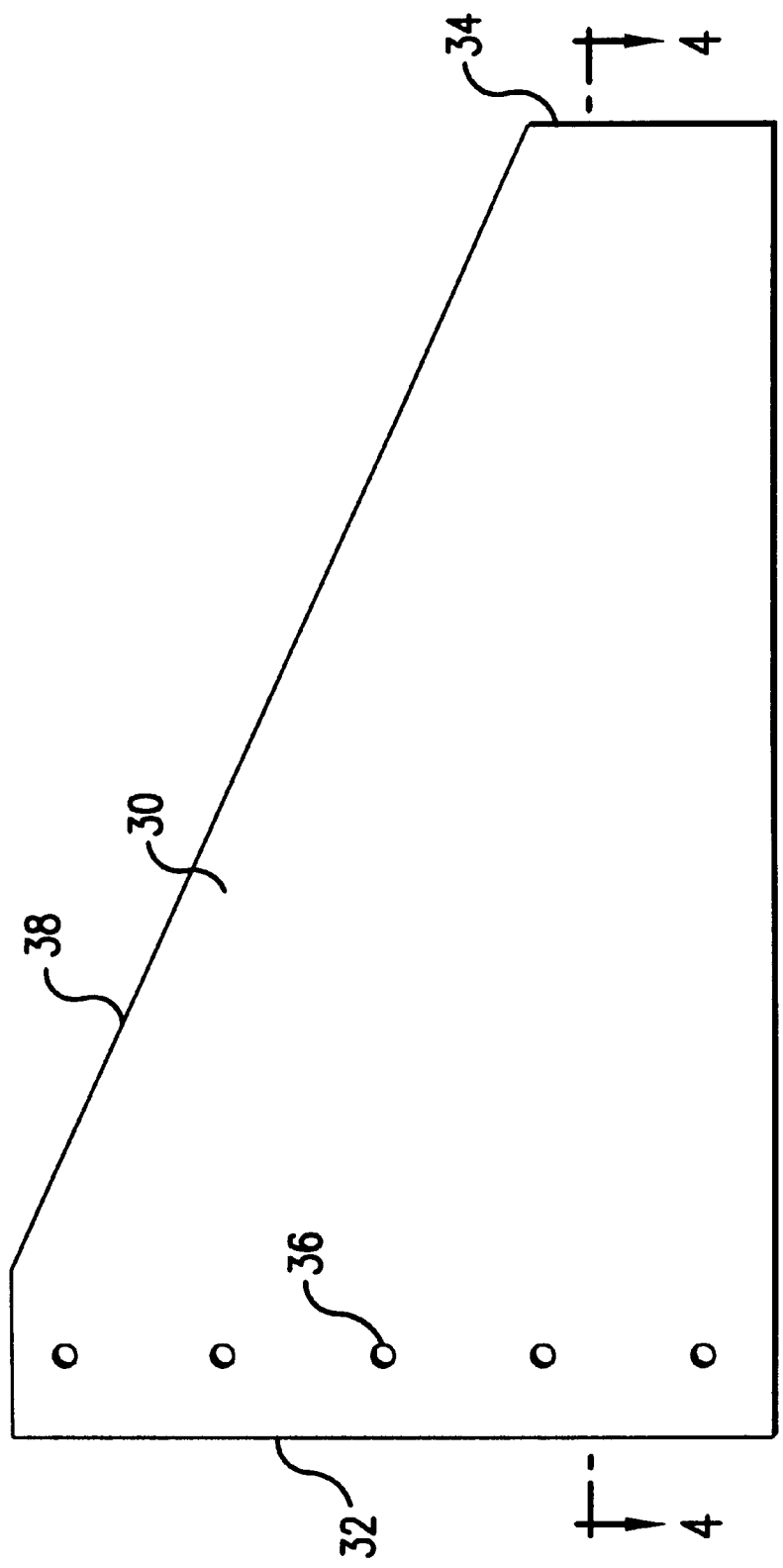

METHOD AND APPARATUS FOR AERATION USING FLEXIBLE BLADE IMPELLER

BACKGROUND OF THE INVENTION

1. Field of the Invention

This invention relates to an apparatus for inducing a local flow in a fluid, such as for example, an impeller for aerating a liquid and an aeration method using the impeller. More particularly, this invention relates to an aeration method and an apparatus using an impeller having blades that flex as a function of impeller speed, so that at lower impeller speeds the blades are substantially radial, and at full operating speed the blades are fully backward-curved, thereby maintaining a more constant velocity of fluid exiting the impeller.

2. Description of Related Art

Radial impellers or rotors are used in many devices, such as vacuum cleaners, fluid pumps, air compressors, mixers and wastewater aerators. These devices typically comprise a circular central plate or hub, onto which a number of impeller blades are mounted. The performance of an impeller is a function of many variable factors, such as impeller diameter, blade width, blade angle and/or curvature, number and spacing of blades, etc. For a given impeller geometry, the impeller's performance will be most efficient at a specific impeller rotation speed (RPM), with specific inlet and outlet conditions. This optimum impeller speed and the specific inlet and outlet conditions are termed the impeller's "design conditions." The performance of an impeller typically is less than optimal when the impeller operates at other than its design conditions.

It has been found that non-radial, backward-curved impeller blades provide increased volumetric capacity, allowing an impeller to pump more fluid for a given power input than with radial blades. By "backward-curved," it is meant that a blade curves along its length, in a direction opposite the direction of the impeller's rotation, from the blade's root to its tip. Non-radial impeller blades, however, are generally more expensive to manufacture than are radial blades.

In many applications, it is important that the velocity of the fluid exiting the impeller (the "exit velocity" or "local flow velocity") be controlled. For example, in wastewater aeration applications, it is critical that the water leaving the impeller have a minimum local flow velocity, relative to the remainder of the body of wastewater, of approximately 12 feet per second (ft./sec.). At this speed, "white water" is generated, which is where aeration occurs. If the local flow velocity of the wastewater from the impeller drops below 12 ft./sec., sufficient aeration will not be achieved. It is therefore common for aeration facilities using known, fixed-blade impeller configurations to drive the impellers at a rotational speed which results in a local flow velocity incrementally greater than 12 ft./sec.--commonly approximately 18 ft./sec. Increasing the local flow velocity beyond the minimum needed to generate white water, however, does not appreciably improve aeration. Thus, driving the impeller at higher rotational speeds than necessary to achieve the minimum local flow velocity needed for aeration wastes energy, and unnecessarily increases operating costs.

Many aeration facilities attempt to reduce unnecessary energy consumption by controlling the rotational speed at which an aeration impeller is driven. For example, many aeration installations use two-speed electric motors to drive the aeration impellers. Alternatively, variable-frequency drives (VFD's) may be used with the drive motors for the impellers, enabling the motor speed to be continuously controlled within an operating range. Some installations use dissolved oxygen monitors to control the drive speed of the impellers responsive to the oxygen content of the wastewater. However, with known, rigid-blade impeller configurations, the local flow velocity of water from the impeller is a function of the speed of rotation of the impeller. Therefore, adjusting the rotational speed of the impeller's drive motor directly affects the local flow velocity of water discharged from the impeller. As discussed above, a local flow velocity which is too low results in insufficient aeration, whereas a local flow velocity which is too high wastes energy. Thus, known, rigid-blade aeration impeller configurations suffer the disadvantage that they have a narrow range of rotational drive speeds providing efficient operation.

Thus, it can be seen that a need exists for an aeration impeller capable of operating efficiently over a broader range of rotational drive speeds than is permitted by known impeller configurations. It is to the provision of such a device that the present invention is primarily directed.

SUMMARY OF THE INVENTION

The above-noted disadvantages of the prior art are overcome by the present invention, which in one aspect is an aeration impeller for aerating a liquid by inducing a local flow velocity in a portion of the liquid. As discussed above, the local flow velocity is the exit velocity of the liquid discharged from the impeller and, as measured relative to the remainder of the liquid, generally must be a minimum of approximately 12 ft./sec. to provide sufficient aeration. The impeller includes a hub portion for connection to a drive means for rotationally driving the impeller at a rotational drive speed. At least one flexible impeller blade is connected to the hub portion, the impeller blade having a stiffness which allows flexure of the blade between a first blade configuration when the impeller is stationary, and a second blade configuration when the impeller is driven at the rotational drive speed. In a preferred embodiment, the first blade configuration corresponds to a generally straight, radial blade position, extending outward from the hub portion. The second blade configuration is preferably a non-radial, backward-curved blade configuration.

Another aspect of the present invention provides an aeration impeller for aerating a liquid by inducing a local flow velocity in a portion of the liquid, which impeller includes a plurality of flexible impeller blades, each having a stiffness allowing flexure of the blades between a first blade configuration and a second blade configuration. Coupling means are provided for connecting the plurality of flexible impeller blades to a drive means for driving the impeller at a rotational drive speed. This aspect of the invention further includes flexure means for controlling the movement of the plurality of flexible impeller blades between the first blade configuration and the second blade configuration. The flexure means can take the form of any of a number of embodiments. For example, a tapered portion can be provided in each of the plurality of flexible impeller blades to control the movement of the impeller blades between the first blade configuration and the second blade configuration under the influence of the impeller's motion in the liquid. Alternatively, at least one groove can be provided in each of the flexible impeller blades to control the movement of the impeller blades between the first blade configuration and the second blade configuration under the influence of the impeller's motion in the liquid. In still another alternate embodiment, a laminated blade construction of the flexible impeller blades controls the movement of the impeller blades between the first blade configuration and the second blade configuration under the influence of the impeller's motion in the liquid. Yet another alternate embodiment includes a mechanical actuation means for controlling the movement of each of the plurality of flexible impeller blades between the first blade configuration and the second blade configuration.

Another aspect of the present invention provides a method of aerating a liquid using an impeller. The method includes the step of driving the impeller at a rotational drive speed adjacent a surface portion of the liquid, inducing a local flow velocity in a portion of the liquid, and flexing at least one blade portion of the impeller in response to the rotational drive speed to maintain the local flow velocity substantially constant as the rotational drive speed varies within a range.

As described in greater detail herein, the method and apparatus of the present invention provide several advantages over known methods and devices for the aeration of a liquid. For example, the use of flexible impeller blades allows the increased volumetric capacity of backward-curved impeller blades to be achieved without the expense typically involved in the manufacture of rigid, backward-curved impeller blades. An inexpensive impeller blade can be fabricated from a straight piece of flexible material, which has a stiffness chosen to allow the blade to flex into the desired backward-curved configuration under the influence of the impeller's rotation in the liquid. Essentially, the liquid's resistance to the impeller's rotation within the liquid imparts a force on the blade, causing the blade to flex in the direction opposite the impeller's rotation.

Additionally, the flexible nature of the impeller blades of the present invention provides improved efficiency of operation over known impeller constructions. As discussed above, with known rigid-blade impeller configurations, adjusting the rotational drive speed of the impeller directly affects the exit velocity of water from the impeller. An exit velocity which is too low results in insufficient aeration, whereas an exit velocity which is too high wastes energy as the excess exit velocity does not substantially increase aeration. Thus, known, rigid-blade aeration impeller configurations have a narrow range of rotational drive speeds which provide efficient operation.

By contrast, the impeller of the present invention allows efficient operation over a broader range of rotational drive speeds. The stiffness of the impeller blades of the present invention can be selected so that the amount of flexure of the blades is a function of the rotational speed at which the impeller is driven, at least within a specified range of rotational speeds. At a constant rotational speed, the local flow velocity generated by an impeller decreases, and the impeller's volumetric capacity increases, as the impeller's blades curve further backwardly. This is a result of the decrease in diameter of the impeller as the blades' curvature increases, and of the effect of the blades' curvature on the radial and tangential components of the resultant velocity exiting the impeller, as discussed below.

Thus, by selecting the stiffness of the blades appropriately, an impeller configuration can be developed in which the impeller's blades will flex progressively backwardly in response to increasing rotational speed, whereby a substantially constant local flow velocity is achieved, even as the rotational speed varies within a range. For example, if such an impeller is driven at the minimum rotational speed necessary to create a local flow velocity of 12 ft./sec., the impeller blades will flex into a configuration which generates the 12 ft./sec. local flow velocity. If the rotational speed is then increased, the blades will flex into a more backwardly-curved configuration, and thereby maintain the local flow velocity at 12 ft./sec. Rather than wasting the excess energy input to drive the impeller at the increased rotational speed, as is the case with known impellers, the impeller of the present invention utilizes this energy by increasing the volume of liquid discharged at the desired local flow velocity.

These and other advantages will become apparent from the following description of the preferred embodiment taken in conjunction with the following drawings, although variations and modifications may be effected without departing from the spirit and scope of the novel concepts of the disclosure.

BRIEF DESCRIPTION OF THE FIGURES OF THE DRAWINGS

FIG. 3 is a side elevational view of an impeller blade according to a preferred form of the present invention.

DETAILED DESCRIPTION OF THE INVENTION

Figure 1:
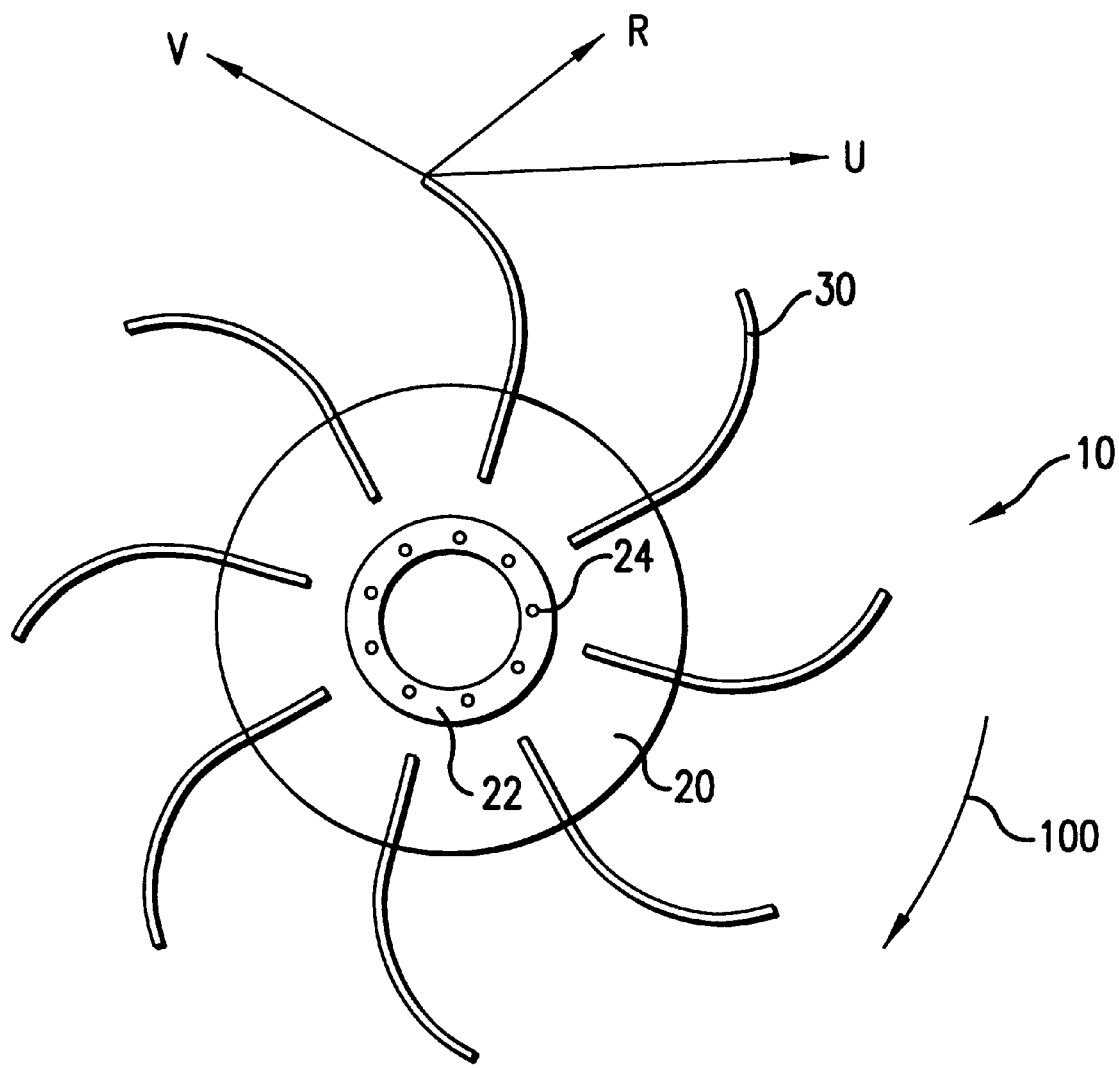
FIG. 1 is a top plan view of an aeration impeller according to a preferred form of the present invention, depicted at full operating speed.

Referring now in detail to the drawing figures, wherein like reference numbers indicate like parts throughout, the preferred embodiments of the present invention will now be described. As used in the description herein and throughout the claims that follow, "a," "an," and "the" includes plural reference unless the context clearly dictates otherwise. Also, as used in the description herein and throughout the claims that follow, the meaning of "in" includes "in" and "on" unless the context clearly dictates otherwise.

Referring now to FIG. 1, in a preferred embodiment, the present invention comprises an aeration impeller 10 for aerating a liquid (unshown) by inducing a local flow velocity in a portion of the liquid. The impeller preferably comprises a hub portion 20, and a plurality of impeller blades 30 connected to the hub 20 and extending generally outwardly therefrom. The hub 20 preferably comprises a generally disc-shaped element, and can further comprise a mounting flange 22 or other coupling means for connecting the impeller 10 to a drive means for rotationally driving the impeller 10. The mounting flange 22 can be provided with one or more holes 24 for receiving bolts (unshown) or other connection means for securing the impeller 10 to the drive means. The drive means can be, for example, an electrical motor having one or more discrete speeds, or having a variable speed drive for controlling the speed at which the impeller 10 is rotationally driven.

As shown best by FIGS. 3 and 4, the impeller blades 30 preferably comprise thin, generally flat elements having an inner or root edge 32, and an outer edge 34 opposite the root edge 32. The impeller blades 30 are preferably fabricated from a flexible, elastic material such as nylon, UHMW, or other resilient plastics. The dimensions and materials of construction of the impeller blades 30 are selected to provide a desired stiffness and flexure profile, as described in greater detail below. The root edge 32 of the impeller blade 30 is preferably provided with means for connecting the impeller blade to the hub 20, such as one or more holes 36 for receiving bolts (unshown). Alternatively, the impeller 10 can be fabricated as a unitary component. The connection between the impeller blade 30 and the hub 20 is preferably a cantilevered connection.

Figure 2:
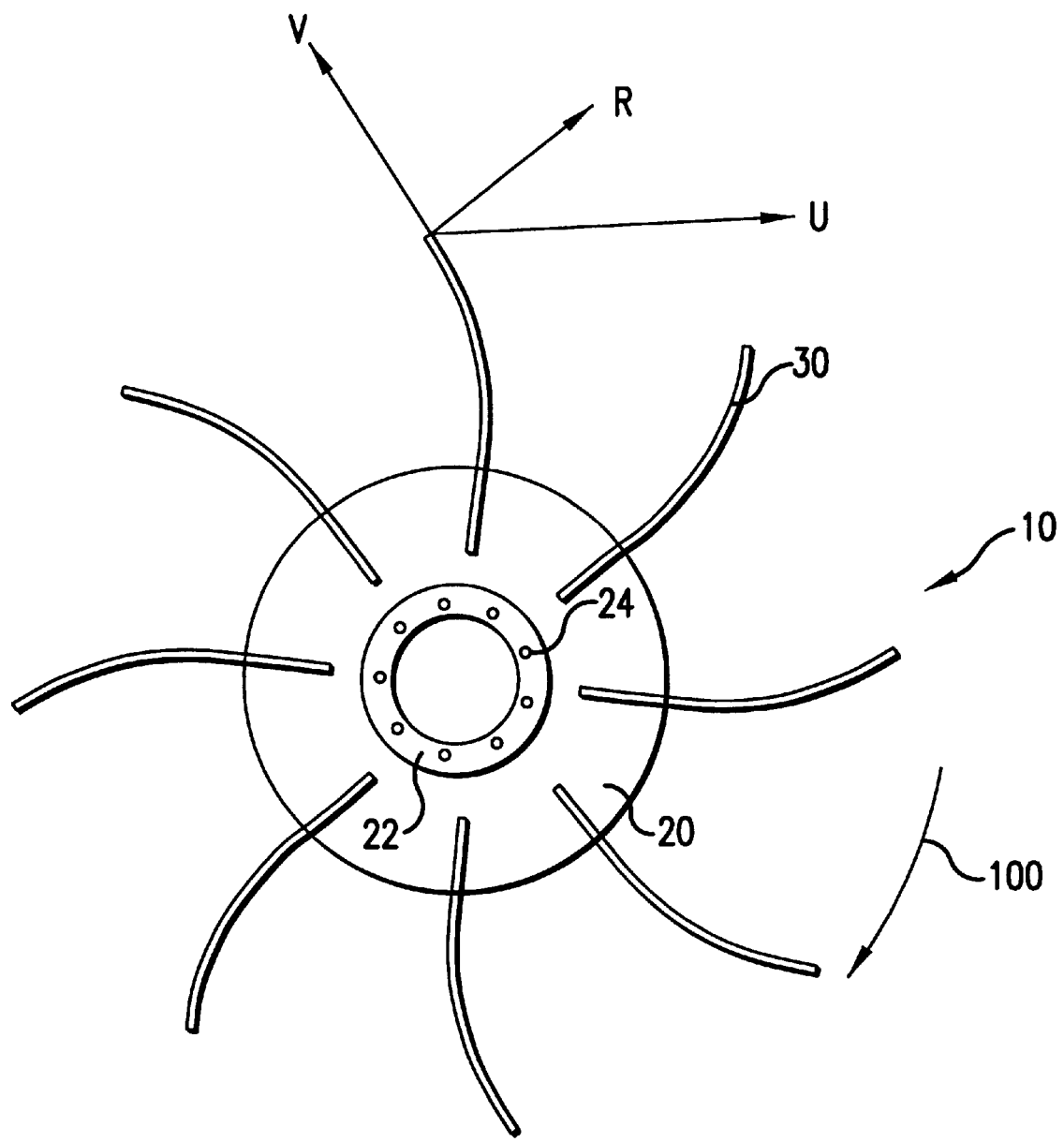
FIG. 2 is a top plan view of the aeration impeller shown in FIG. 1, depicted at less than full operating speed.

As shown best in FIGS. 1 and 2, the impeller blades 30 of the present invention are flexible. As used herein, the term "flexible" is intended to comprehend both a continuous flexure along the length of the impeller blade 30, or a discontinuous flexure, as would be achieved, for example, by providing one or more joints along the length of the impeller blade 30 about which joints the impeller blade 30 could be articulated in discrete segments. In preferred form, the flexible impeller blades 30 are fabricated to have a stiffness and bending profile which enables the impeller blades 30 to flex between a first blade configuration when the impeller 10 is stationary, and a second blade configuration when the impeller 10 is driven at the maximum intended rotational drive speed. The impeller blades 30 will pass through a continuous range of intermediate blade configurations between the first and second blade configurations as the rotational drive speed of the impeller 10 varies between rest and its maximum speed.

In one embodiment of the present invention, the first blade configuration is a generally radial configuration, wherein the impeller blade 30 extends generally outwardly from the hub portion 20, and is generally straight when the impeller 10 is stationary. The second blade configuration of this embodiment is preferably a fully backward-curved blade configuration, extending non-radially outwardly from the hub portion 20 and curved in the direction opposite the rotation of the impeller 10. In alternate embodiments, the first blade configuration can be forward-curved or backward-curved, and the second blade configuration will be displaced relative to the first blade configuration in the direction opposite the rotation of the impeller.

The stiffness of the impeller blades 30 is preferably selected to enable the impeller blades 30 to flex in response to the rotational motion of the impeller 10. Essentially, the viscosity of the fluid in which the impeller 10 is disposed will resist the rotational movement of the impeller blades 30 within the fluid, and thereby impart a force on the impeller blades 30 in the direction opposite the impeller's rotation. As the rotational drive speed of the impeller is increased, this resultant force likewise increases, thereby causing the impeller blades 30 to progressively flex as the rotational drive speed of the impeller 10 is increased. Appropriate selection of the stiffness of the impeller blades 30 can enable a substantially constant local flow velocity from the impeller 10 to be maintained, even as the rotational speed of the impeller 10 varies within a range. The necessary blade stiffness for various impeller applications can be experimentally determined, or can be predicted by computer simulation, by one of ordinary skill in the art.

The present invention preferably further comprises flexure means for controlling the movement of the flexible impeller blades 30 between the first blade configuration and the second blade configuration. The flexure means can be passive, whereby the impeller blades 30 are constructed in a manner which enables the movement of the impeller blades 30 between the first blade configuration and the second blade configuration to be controlled solely under the influence the forces imparted upon the impeller blades 30 resulting from rotationally driving the impeller 10 within a liquid. Typically, passive control of the flexure of the impeller blades 30 is achieved by varying the width and/or thickness of the blade 30 along its length, or by introducing other discontinuities in the stiffness of the blade. Alternatively, active flexure means can be provided, whereby external forces, in addition to those imposed by rotation of the impeller 10 act to control the movement of the impeller blades 30 between the first blade configuration and the second blade configuration.

FIGS. 3 and 4 show several possible embodiments of passive flexure means. For example, FIG. 3 shows an impeller blade 30 having a sloped upper edge 38. In this manner, the impeller 30 shown in FIG. 3 will be wider and will, therefore, have a larger cross-sectional area adjacent its root edge 32 than the cross-sectional area adjacent its outer edge 34. Thus, the impeller blade 30 will be stiffer and, therefore, more resistant to bending stresses adjacent its root edge 32 than adjacent its outer edge 34. In this manner, the bending profile of the impeller blades 30 can be affected by varying the cross-sectional area, and thus the stiffness, of the impeller blades 30 along their length.

Figure 4A:
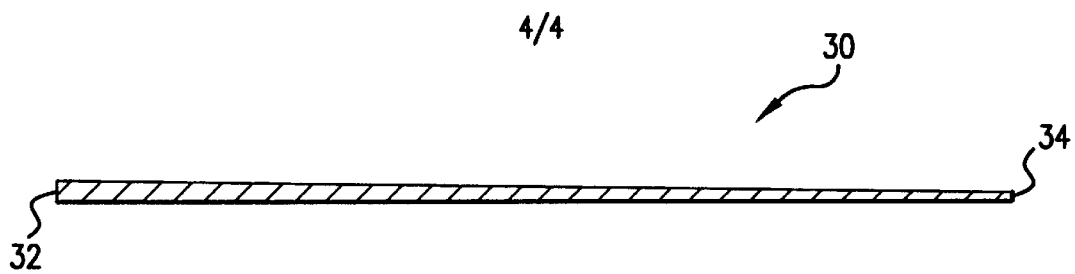
FIGS. 4a–4c are cross-sectional views of three embodiments of an impeller blade according to alternative forms of the present invention.

FIGS. 4a–41c show various alternate embodiments of an impeller blade 30 with massive flexure means, in cross-sectional view taken at position 4 as shown in FIG. 3. FIG. 4a shows a tapered blade section, wherein the thickness of the impeller blade 30 is greater at its root edge 32 than at its outer edge 34. As described above, the flexure of the impeller blades 30 can be controlled by varying the cross-sectional area, and thus the resistance to bending, along the length of the impeller blade 30.

Figure 4B:
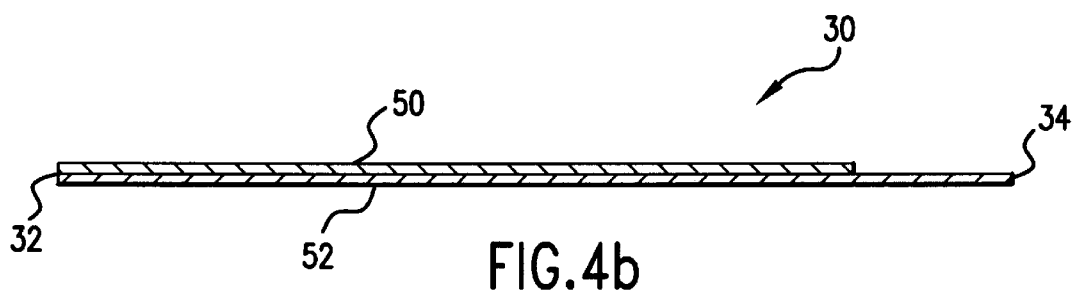

FIG. 4b shows an alternate embodiment of an impeller blade 30 with passive flexure means, wherein the impeller blade 30 is fabricated from two or more layers 50, 52. By providing layers 50, 52 of differing lengths, the cross-sectional area of the impeller blade 30 can be varied along its length, to control the flexure of the impeller blades in a manner similar to that described above. In addition, the embodiment of FIG. 4b allows layers 50, 52 of differing stiffness to be provided to control the flexure profile as desired. The layers 50, 52 can be laminated or otherwise connected to one another, or can be free from one another.

Figure 4C:
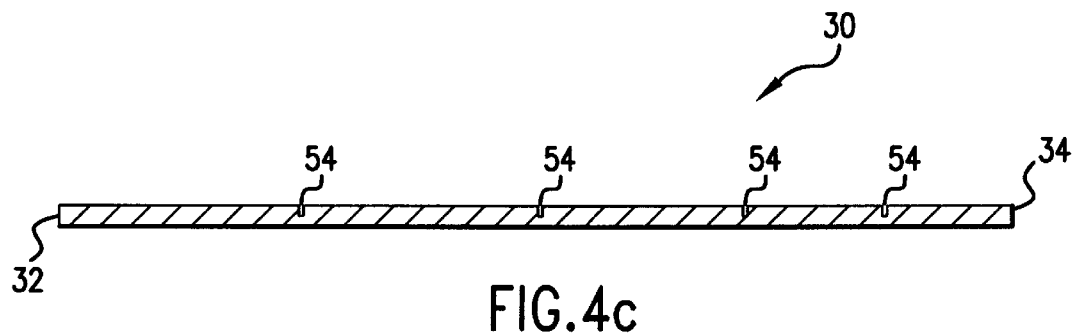

Yet another embodiment of an impeller blade 30 with passive flexure means is shown in cross-sectional view by FIG. 4c. The flexure means of this embodiment comprises one or more grooves 54 provided in the face of the impeller blade 30, across its width. These grooves provide points of flexure for the impeller blade 30. As shown in FIG. 4c, the spacing of the grooves can be selected to control the flexure profile of the impeller blade.

Active flexure means can be provided in addition to, or in lieu of the above-described passive flexure means. For example, a cam can be provided, operated by centrifugal force resulting from the rotational motion of the impeller, to force the impeller blades 30 to the desired blade angle. Such a cam could operate, for example, in the manner of a centrifugal timing advance on an automobile distributor. Alternatively, cables or other mechanical means can be utilized as an active flexure means.

In operation, the flexible-bladed impeller of the present invention enables a method of aerating a liquid which will now be described in a preferred form. The impeller 10 will typically be disposed within a body of liquid, such as wastewater (unshown) to be aerated. The impeller 10 is preferably at least partially submerged adjacent a surface of the body of liquid, in a generally co-planar arrangement with the surface. The impeller 10 is driven at a rotational drive speed by a drive means, as described above. A local flow velocity is induced in a portion of the liquid as it is discharged from the rotating impeller blades 30 of the impeller 10. As discussed above, the resultant forces imposed on the impeller blades 30 by the liquid as the impeller 10 is rotated will cause the impeller blades 30 to flex in response to the rotational drive speed. By appropriately selecting the stiffness of the impeller blades 30, the extent and profile of the flexure of the impeller blades 30 can be controlled to maintain the local flow velocity substantially constant as the rotational drive speed of the impeller 10 varies within a range.

As seen best in FIGS. 1 and 2, the impeller 10 is rotated in the direction of arrow 100. The resultant forces cause the impeller blades 30 to flex in a direction opposite direction arrow 100. The magnitude of flexure of impeller blades 30 will be greater when the impeller 10 is driven at higher rotational drive speeds (FIG. 1), than at lower rotational drive speeds (FIG. 2). One manner of operation of the impeller of the present invention is to design the impeller to take on a fully backward-curved blade configuration and to generate a desired local flow velocity at the full (maximum) operating speed of the drive means which rotationally drives the impeller. This configuration will provide the maximum volumetric capacity achievable by the impeller, thus maximizing aeration. Then, in the event that the rotational drive speed is reduced, the impeller blades 30 will spring back to a more radial configuration, maintaining the desired local flow velocity substantially constant throughout a range of rotational drive speeds, but operating at a reduced volumetric capacity.

The resultant velocity of fluid exiting the impeller 10 (i.e., the local flow velocity) is indicated in FIGS. 1 and 2 by vector R. This resultant velocity R is a combination of the tangential velocity component represented by vector U, and the radial velocity component represented by vector V. The tangential velocity U is directly related to the outer diameter and rotational drive speed of the impeller 10. Accordingly, vector U is depicted of greater magnitude in FIG. 1 than in FIG. 2, representing the greater rotational drive speed depicted by FIG. 1. The radial component of the resultant velocity, designated by vector V in FIGS. 1 and 2, is a function of the flexure of the impeller blades 30. The flexure of the impeller blades 30 is, in turn, a function of the rotational drive speed of the impeller 10, and of the stiffness of the impeller blades 30. Therefore, a variation in the stiffness of the impeller blades 30 results in a corresponding variation in the radial velocity V, which in turn affects the resultant velocity R. In this manner, appropriate selection of the stiffness of the impeller blades 30 can be used to maintain the resultant velocity R substantially constant, even as the tangential velocity U varies within a range.

The above described embodiment is given as an illustrative example only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An aeration impeller for inducing a local flow velocity in a fluid, said apparatus comprising:

(a) a hub portion for connection to a drive means for rotationally driving said aeration impeller at a rotational drive speed;

(b) at least one flexible impeller blade connected to said hub portion, wherein said at least one flexible impeller blade has a stiffness allowing flexure between a first blade configuration when said aeration impeller is stationary and a second blade configuration when said aeration impeller is driven at the rotational drive speed and wherein the stiffness of said at least one flexible impeller blade is selected to maintain a substantially constant local flow velocity as the rotational drive speed varies within a range.

2. The apparatus of claim 1, wherein said at least one flexible impeller blade extends generally radially from said hub portion in the first blade configuration, and wherein the second blade configuration is a backward-curved blade configuration.

3. The apparatus of claim 2, further comprising flexure means for controlling the movement of said at least one flexible impeller blade between the first blade configuration and the second blade configuration.

4. The apparatus of claim 3, wherein said flexure means comprises a tapered portion in said at least one flexible impeller blade.

5. The apparatus of claim 3, wherein said flexure means comprises at least one groove in said at least one flexible impeller blade.

6. The apparatus of claim 3, wherein said flexure means comprises a laminated blade construction for said at least one flexible impeller blade.

7. An aeration impeller for aerating a liquid by inducing a local flow velocity in a portion of the liquid, said impeller comprising:

(a) a plurality of flexible impeller blades, each having a stiffness allowing flexure between a first blade configuration and a second blade configuration, and wherein said stiffness of each of said plurality of flexible impeller blades is selected to maintain a substantially constant local flow velocity as the rotational drive speed varies within a range;

(b) coupling means for connecting said plurality of flexible impeller blades to a drive means for driving said impeller at a rotational drive speed; and (c) flexure means for controlling the movement of said plurality of flexible impeller blades between the first blade configuration and the second blade configuration.

8. The aeration impeller of claim 7, wherein said flexure means comprises a tapered portion in each of said plurality of flexible impeller blades.

9. The aeration impeller of claim 7, wherein said flexure means comprises at least one groove in each of said plurality of flexible impeller blades.

10. The aeration impeller of claim 7, wherein said flexure means comprises a laminated blade construction for each of said plurality of flexible impeller blades.

11. The aeration impeller of claim 7, wherein each of said plurality of flexible impeller blades extends generally radially from said coupling means in the first blade configuration, and wherein the second blade configuration is a backward-curved blade configuration.

12. A method of aerating a liquid using an impeller, said method comprising:

(a) driving the impeller at a rotational drive speed adjacent a surface portion of the liquid;

(b) inducing a local flow velocity in a portion of the surface of the liquid; and (c) flexing at least one blade portion of the impeller in response to the rotational drive speed to maintain the local flow velocity substantially constant as the rotational drive speed varies within a range.

13. The method of claim 12, wherein said flexing step comprises moving the at least one blade portion between an intermediate blade configuration corresponding to a low rotational drive speed within the range and a second blade configuration corresponding to a high rotational drive speed within the range.

14. The method of claim 13, wherein the intermediate blade configuration and the second blade configuration are backward-curved relative to the rotational drive speed.

15. The method of claim 14, wherein the second blade configuration has a greater magnitude of curvature than the intermediate blade configuration.

16. The method of claim 12, wherein the impeller is driven at a rotational drive speed sufficient to impart a local flow velocity from the impeller of greater than 12 feet per second.

17. The method of claim 16, wherein the impeller is driven at a rotational drive speed sufficient to impart a local flow velocity from the impeller of approximately 18 feet per second.

* * * * *